US006439951B1

(12) United States Patent
Kawakita

(10) Patent No.: US 6,439,951 B1
(45) Date of Patent: Aug. 27, 2002

(54) CONNECTING APPARATUS AND ROBOT

(75) Inventor: Kozo Kawakita, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/622,552

(22) PCT Filed: Dec. 21, 1999

(86) PCT No.: PCT/JP99/07178

§ 371 (c)(1),
(2), (4) Date: Oct. 31, 2000

(87) PCT Pub. No.: WO00/37223

PCT Pub. Date: Jan. 29, 2000

(30) Foreign Application Priority Data

Dec. 21, 1998 (JP) .......................................... 10-362298

(51) Int. Cl.$^{7}$ ............................... A63H 3/20; B25J 5/00

(52) U.S. Cl. ....................... 446/330; 446/268; 446/356; 446/376; 901/1

(58) Field of Search ............................. 446/69, 71, 72, 446/85, 88, 91, 93, 94, 97, 98, 99, 100, 378, 376, 362, 361, 330–340, 344, 348, 282, 268; 439/217, 300, 222, 714; 901/1, 3, 8, 224, 715, 246, 721, 247, 723, 248, 928, 259, 954, 299, 325, 342, 343, 345, 350, 352, 368, 374

(56) References Cited

U.S. PATENT DOCUMENTS

| | | | | | |
|---|---|---|---|---|---|
| 4,109,398 | A | * | 8/1978 | Hida | 35/13 |
| 4,186,515 | A | * | 2/1980 | Ogawa | 46/22 |
| 4,712,184 | A | * | 12/1987 | Haugerud | 364/513 |
| 4,822,296 | A | | 4/1989 | Wilson | 439/343 |
| 5,378,184 | A | * | 1/1995 | Bro et al. | 446/99 |
| 5,766,077 | A | | 6/1998 | Hongo | 463/30 |
| 6,116,932 | A | * | 9/2000 | Kawakita | 439/224 |

FOREIGN PATENT DOCUMENTS

| | | |
|---|---|---|
| EP | 0 744 199 A2 | 5/1996 |
| EP | 0 295 340 | 9/1997 |
| JP | 63-53874 | 3/1988 |
| JP | 64-10586 | 1/1989 |
| JP | 9-47575 | 2/1997 |

* cited by examiner

*Primary Examiner*—Jessica Harrison
*Assistant Examiner*—Alex F. R. P. Rada, II
(74) *Attorney, Agent, or Firm*—Rader, Fishman & Grauer PLLC; Ronald P. Kananen, Esq.

(57) ABSTRACT

When a lower component being different size is selectively and removably connected to an upper component, mechanical and electrical connecting means of the upper component is commonly used, and simultaneously they are connected by mechanical and electrical connecting means being the size corresponding to the size of the lower component.

9 Claims, 14 Drawing Sheets

CONNECTING APPARATUS AND ROBOT

TECHNICAL FIELD

This invention relates a connecting apparatus and a robot, and more particularly, is applicable to a connecting apparatus for connecting components and a robot using the connecting apparatus.

BACKGROUND ART

Heretofore, as shown in FIG. 13 and FIG. 14, in a connecting apparatus 41 for connecting components, the apparatus for connecting selectively and removably lower components 43, 44 which are different size to one upper component 42 by a mechanical and electrical connecting means 45 is generally limited to one type in the shape, structure, and size of the mechanical and electrical connecting means 45, regardless of the size of the lower components 43, 44.

Therefore, the following problems are easy to occur. As shown in FIG. 13, in a case where the size of the lower component 43 is smaller than that of the upper component 42, the size of the mechanical and electrical connecting means 45 becomes too larger than that of the lower component 43, thereby the lower component 43 is needed to be large so as to fix into the size of the mechanical and electrical connecting means 45. And as shown in FIG. 14, in a case where the size of the lower component 44 is larger than that of the upper component 42, the size of the mechanical and electrical connecting means 45 becomes too smaller than that of the lower component 44, thereby the strength of the connecting means 45 becomes insufficient.

Also, since the lower component 43 being small size has low power consumption and the lower component 44 being large size has high power consumption, when the size of the mechanical and electrical connecting means 45 is only one type regardless of the size of the lower components 43, 44 which are different size, the electric current which can flow through the connecting means 45 is restricted. Thereby, as shown in FIG. 14, when the lower component 44 being large size is connected to the upper component 42, it is impossible to flow a large amount of electric current which fits into the large size of the lower component 44. That is, there is a problem that the power consumption which is needed by the large size of the lower component 44 can not be supplied sufficiently.

DISCLOSURE OF THE INVENTION

This invention is to solve the above problems, and to provide a connecting apparatus for connecting so as to fit into the size of the lower component when a plurality of lower components which are different size are selectively and removably connected to an upper component by a mechanical and electrical connecting means, and to provide a robot using the connecting apparatus.

To solve the above problems, according to this invention, the connecting apparatus provides a plurality of mechanical and electrical connecting means which are arranged according to a regulation in the upper component, and provides, in each of the lower components which are different size selectively connected to the upper component, a plurality of mechanical and electrical connecting means being set to the number corresponding to the mechanical and electrical connecting means of the upper component and corresponding to the size of these lower components.

As a result, when the lower components which are different size are selectively and removably to the upper component, the connecting apparatus can commonly use the mechanical and electrical connecting means of the upper component, and at the same time, can connect by the mechanical and electrical connecting means being the size fitting into the size of the lower component.

The connecting apparatus and the robot constructed as described above give the following effects.

In the connecting apparatus according to claim 1, when the lower components which are different sizes are selectively and removably connected to the upper component, it is connected by the mechanical and electrical connecting means having the size corresponding to the size of the lower component, commonly using the mechanical and electrical connecting means of the upper component. Thereby, various lower components having different sizes can be freely connected to the upper component. At the time, it can be connected with the connection strength corresponding to the size of the lower component and the electric current corresponding to the size of the lower component can be supplied.

In the connecting apparatus according to claim 2, the mechanical connecting means is composed of a plurality of connection holes and connection pawls, and the electrical connecting means is composed of main connection terminals which are arranged at predetermined positions and sub-connection terminals which are connected at a plurality of connection holes, and connection pawls. Thereby, the binding strength according to the connection holes and the connection terminals is effectively used so as to obtain the stable electrical connection, and simultaneously, the simplification of the construction can be realized.

In the robot according to claim 3, a plurality of robot constituting units can be selectively and removably connected to a plurality of planes of common body unit by the mechanical and electrical connecting means. Thereby, Robots having various shapes can be constructed freely and easily.

In the robot according to claim 4, a plurality of robot constituting units are composed of the head unit, the tail unit, the leg units, and the wheel units. Thereby, Robots having various shapes which resembles an animal such as a dog and a cat can be constructed freely and easily.

BRIEF DESCRIPTION OF DRAWINGS

FIG. 7 is viewed from below;

FIG. 10 is viewed from below;

BEST MODE FOR CARRYING OUT THE INVENTION

Figure 1:
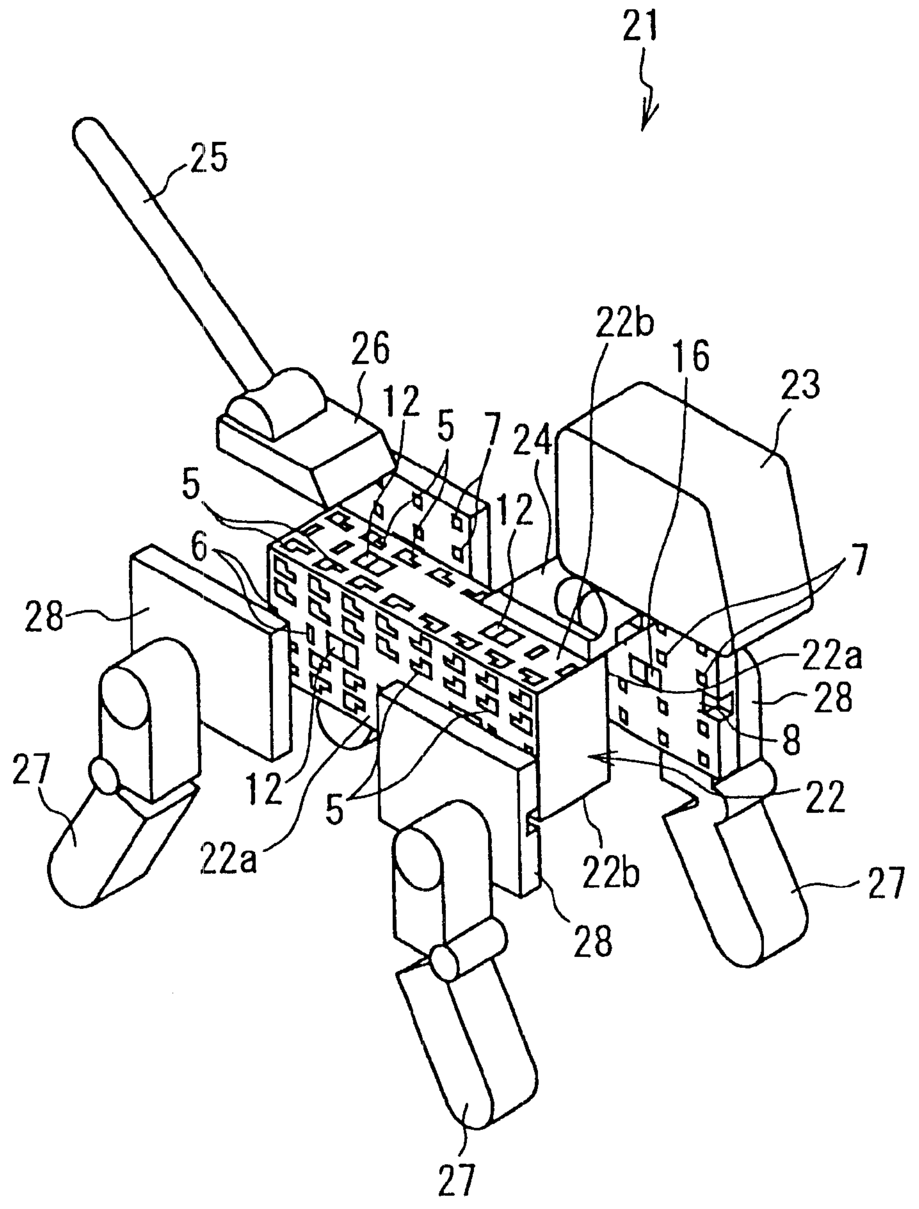
FIG. 1 is a dissected perspective view explaining one example of a robot using a connecting apparatus on which this invention is applied.

Referring to drawings, an embodiment of this invention will be hereinafter described.

(1) Explanation of Connecting Apparatus

First, an connecting apparatus 1 is explained according to FIG. 7 to FIG. 12. The connecting apparatus 1 can selectively and removably connect a plurality of lower components 3, 4 which are different size to one upper component 2 by a mechanical and electrical connecting means.

The mechanical connecting means is composed of lots of connection holes 5 and one or plural locating hole(s) 6 formed on the upper component 2, and lots of connection pawls 7 and one locating pawl 8 formed on the lower components 3, 4. Note that the locating pawl 8 is formed at an elastic piece 9. The connection holes 5 on the upper component 2 are arranged according to a fixed regulation, having the number, e.g., sixteen. The connection pawls 7 on the lower component 3 being larger size are formed having the number corresponding to all of the connection holes 5 on the upper component 2, e.g., sixteen. The connection pawls 7 on the lower component 4 being smaller size are formed having the number corresponding to one portion of sixteen connection holes 5 on the upper component 2, e.g., six. Note that the plane shape of the connection holes 5 are formed into nearly L-shape and the side shape of the connection pawls 7 are formed into nearly L-shape.

The electrical connecting means is composed of a plurality of main connection terminals 12 which are arranged on the top of a convex portion 11 formed at almost the center of the connection area of the upper component 2 and which are used commonly in the lower components 3, 4, sixteen sub-connection terminals 14 which are arranged at all of the sixteen connection holes 5, a plurality of main connection terminals 16 which are arranged on the bottom of a concavity portion 15 formed at almost the center of the connection area of the lower components 3, 4 and which are used commonly in the lower components 3, 4, and sixteen and six sub-connection terminals 18 which are respectively arranged at the sixteen and six connection pawls 7. Note that a terminal lift lever 13 is provided at the side of the convex portion 11 of the upper component 2, and a lift lever driving part 17 is provided at the inner side of the concavity portion 15 of the lower components 3, 4.

This connecting apparatus 1 is constructed as described above. As shown in FIG. 7, FIG. 8, and FIG. 10 to FIG. 12, when the lower component 3 being larger size is connected to the upper component 2, the lower component 3 is approached to the upper component 2 in the vertical direction toward the arrow "a" so as to insert all sixteen connection pawls 7 into the bigger opening of all sixteen connection holes 5 from the arrow "a" direction at the same time. Then, the lower component 3 is slid in the horizontal direction to the upper component 2 along the arrow "b" so that all sixteen connection pawls 7 are hooked to the depth position of the smaller opening of all sixteen connection holes 5 and the locating pawl 8 is hooked into the locating hole 6 using the elastic restitution of an elastic piece 9. The lower component 3 is mechanically connected to the upper component 2 with restricting the return in the horizontal direction of the lower component 3 to the upper component 2.

At this time, after the concavity portion 15 of the lower component 3 is inserted into the convex portion 11 of the upper component 2 from the arrow "a" direction, the terminal lift lever 13 is driven in the arrow "b" direction by the lift lever driving part 17 so that common plural main connection terminals 12 are pressed to the plural main connection terminals 16, and simultaneously, all sixteen sub-connection terminals 14, 18 are pressed mutually (fastened) by all sixteen connection pawls 7. Thereby, the lower component 3 is electrically connected to the upper component 2.

Therefore, in this case, since the lower component 3 being larger size can be mechanically connected to the upper component 2 by using all sixteen connection holes 5 and connection pawls 7, sufficient connection strength fitting into the size of the lower component 3 can be obtained. Simultaneously, since the lower component 3 being larger size can be electrically connected to the upper component 2 by using the common main connection terminals 12, 16 and all sixteen sub-connection terminals 14, 18, a large amount of electrical connection fitting into the size of the lower component 3 can be performed, so that a large amount of electric current can be supplied from the upper component 2 to the lower component 3.

Next, as shown in FIG. 9 to FIG. 12, when the lower component 4 being smaller size is connected to the upper component 2, as described above, the lower component 4 is approached to the upper component 2 in the vertical direction toward the arrow "a" so as to insert all six connection pawls 7 into the bigger opening of all six connection holes 5 from the arrow "a" direction at the same time. Then, the lower component 4 is slid in the horizontal direction to the upper component 2 along the arrow "b" so that six connection pawls 7 are hooked to the depth position of the smaller opening of six connection holes 5 and the locating pawl 8 is hooked into the locating hole 6 using the elastic restitution of the elastic piece 9. The lower component 4 is mechanically connected to the upper component 2 with restricting the return in the horizontal direction of the lower component 4 to the upper component 2.

At this time, as described above, after the concavity portion 15 of the lower component 4 is inserted into the convex portion 11 of the upper component 2 from the arrow "a" direction, the terminal lift lever 13 is driven in the arrow "b" direction by the lift lever driving part 17 so that the common plural main connection terminals 12 are pressed to the plural main connection terminals 16, and simultaneously, six sub-connection terminals 14, 18 are pressed mutually (fastened) by six connection pawls 7. Thereby, the lower component 4 is electrically connected to the upper component 2.

Therefore, in this case, since the lower component 4 being smaller size can be mechanically connected to the upper component 2 by using six connection holes 5 and connection pawls 7 fitting into the size of the lower component 4, sufficient connection strength fitting into the size of the lower component 4 can be obtained. Simultaneously, since the lower component 4 being smaller size can be electrically connected to the upper component 2 by using the common main connection terminals 12, 16 and six sub-connection terminals 14, 18, a small amount of electrical connection fitting into the size of the lower component 4 can be performed, so that a small amount of electric current can be supplied from the upper component 2 to the lower component 4.

(2) Explanation of Robot

Figure 2:
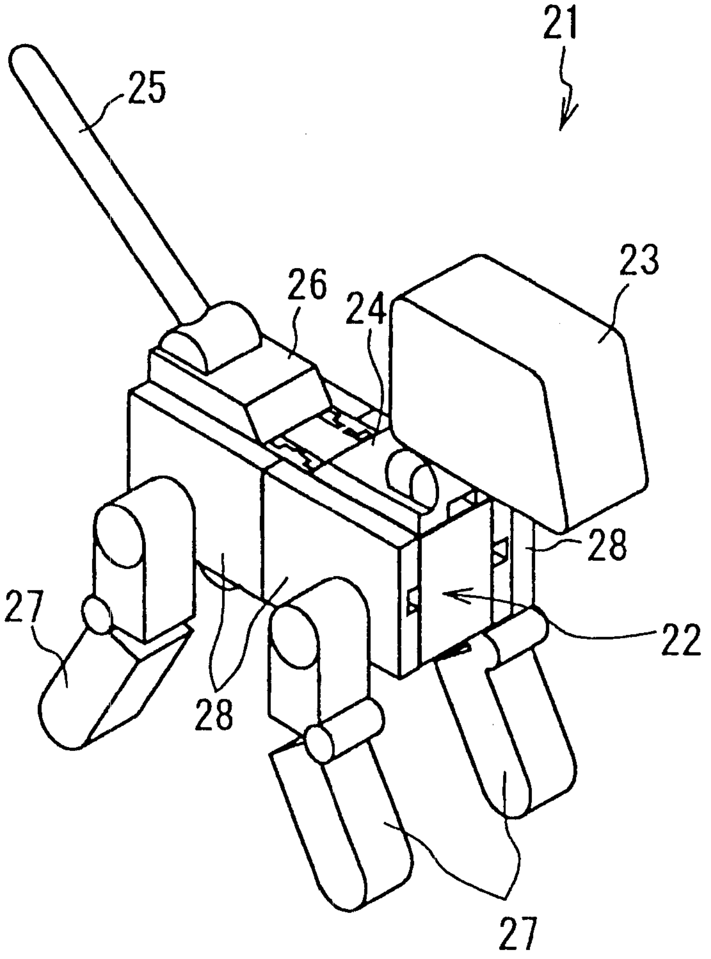
FIG. 2 is a perspective view of the robot of FIG. 1 in the assembled state.
Figure 3:
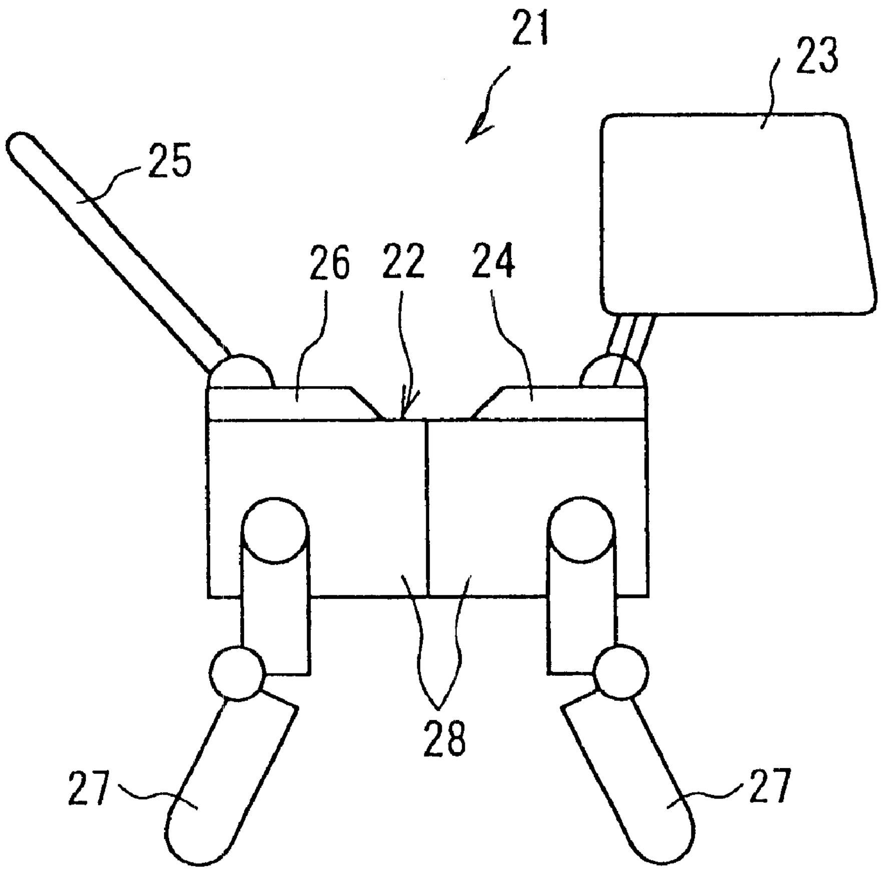
FIG. 3 is a side view of the robot of FIG. 1.

Next, according to FIG. 1 to FIG. 3, a robot 21 which is a robot using the connecting apparatus 1 described above and which has an animal shape such as a dog or a cat will be explained. First, a body unit 22 being a common unit is constructed with a rectangular parallelepiped shape. The areas of both left and right side planes 22*a* are large and the areas of both top and bottom side planes 22*b* are small. On the total six planes of the left and right side planes 22*a* and of the top and bottom side planes 22*b,* two pairs of many connection holes 5, one or plural locating holes, plural common main connection terminals 12, many sub-connection terminals 14, and so on, which are described above, are formed respectively, twelve pairs of them totally.

A plurality of robot constituting units, that is a head unit 23, a tail unit 25, and four leg units 27, are constructed so that they are respectively connected to the body unit 22 so as to be mechanically and electrically removable by a head unit base 24, a tail unit base 26, and a leg unit base 28. To the head unit base 24, the tail unit base 26, and the leg unit base 28, many connection pawls 7, one locating pawl 8, the plural common main connection terminals 16, many sub-connection terminals 18, and so on, which are described above, are connected.

To the front and the rear of the top plane 22*b* having a small area of the body unit 22, the head unit 23 and the tail unit 25 are respectively connected so as to be mechanically and electrically removable by the head unit base 24 and the tail unit base 26. To the front and the rear of the left and right side planes 22*a* having large areas of the body unit 22, four leg units 27 are respectively connected so as to be mechanically and electrically removable by the leg unit base 28. Thereby, the robot 21 shown in FIG. 2 and FIG. 3 can be constructed.

Figure 4:
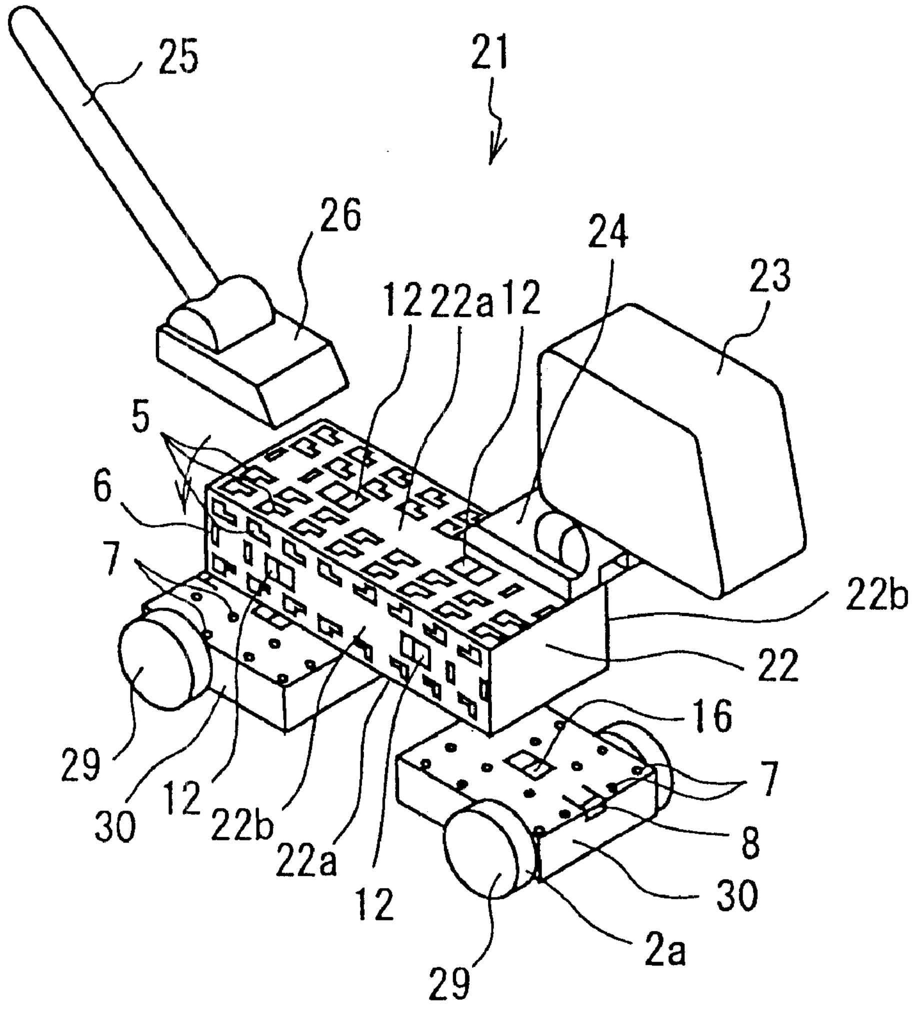
FIG. 4 is a dissected perspective view explaining the other example of the robot of FIG. 1.
Figure 5:
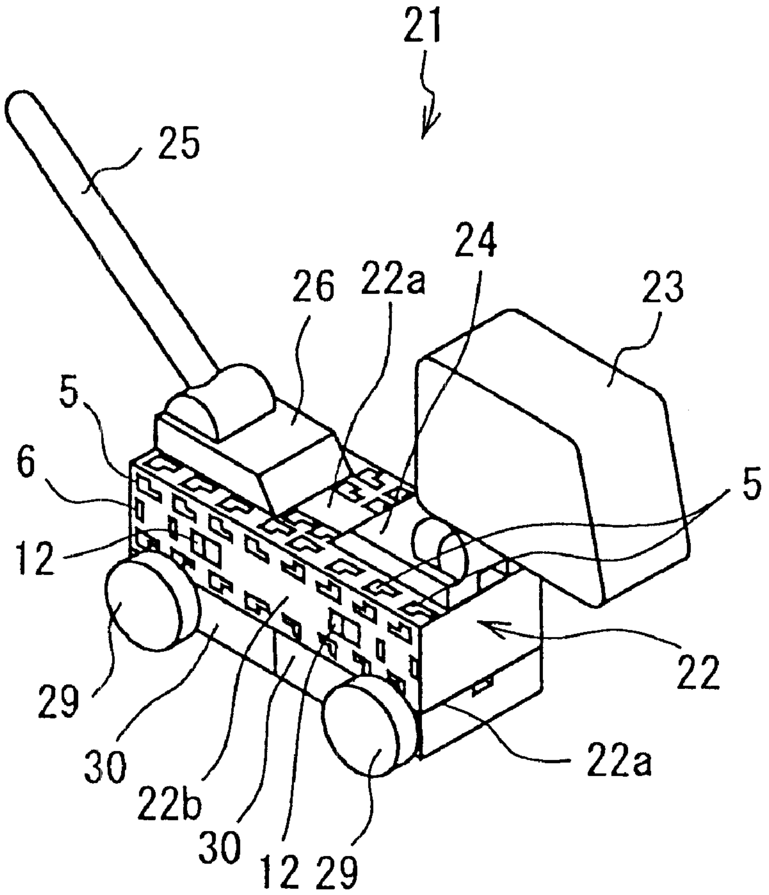
FIG. 5 is a perspective view of the robot of FIG. 4 in the assembled state.
Figure 6:
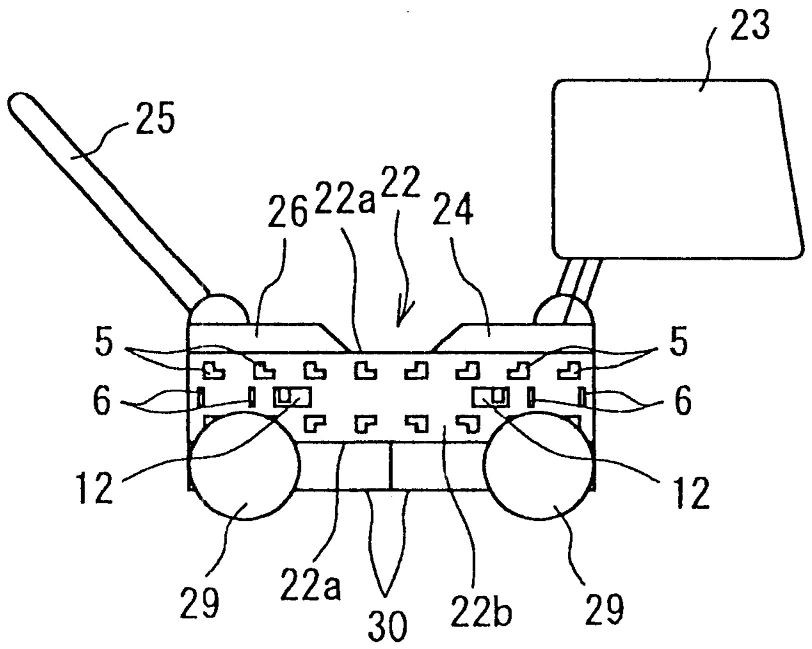
FIG. 6 is a side view of the robot of FIG. 4.
Figure 7:
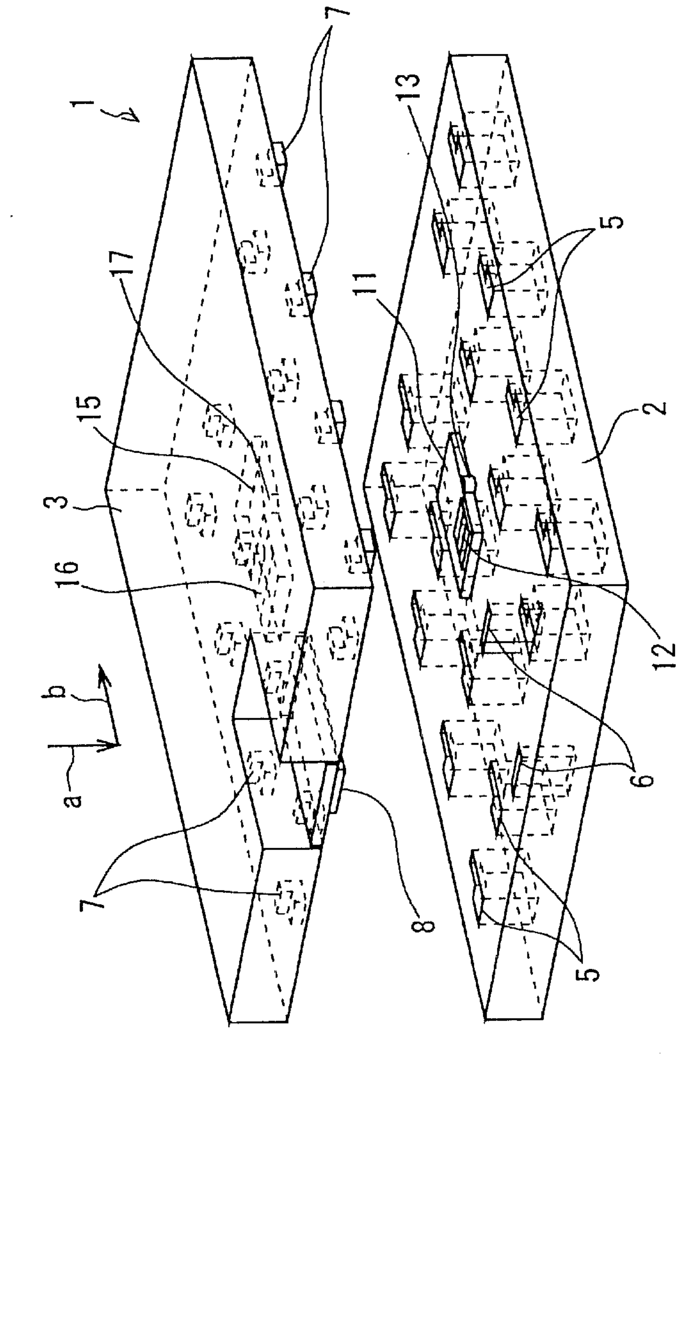
FIG. 7 is a perspective view explaining the embodiment of a connecting apparatus on which this invention is applied, when the lower component being larger size is connected to the upper component.
Figure 8:
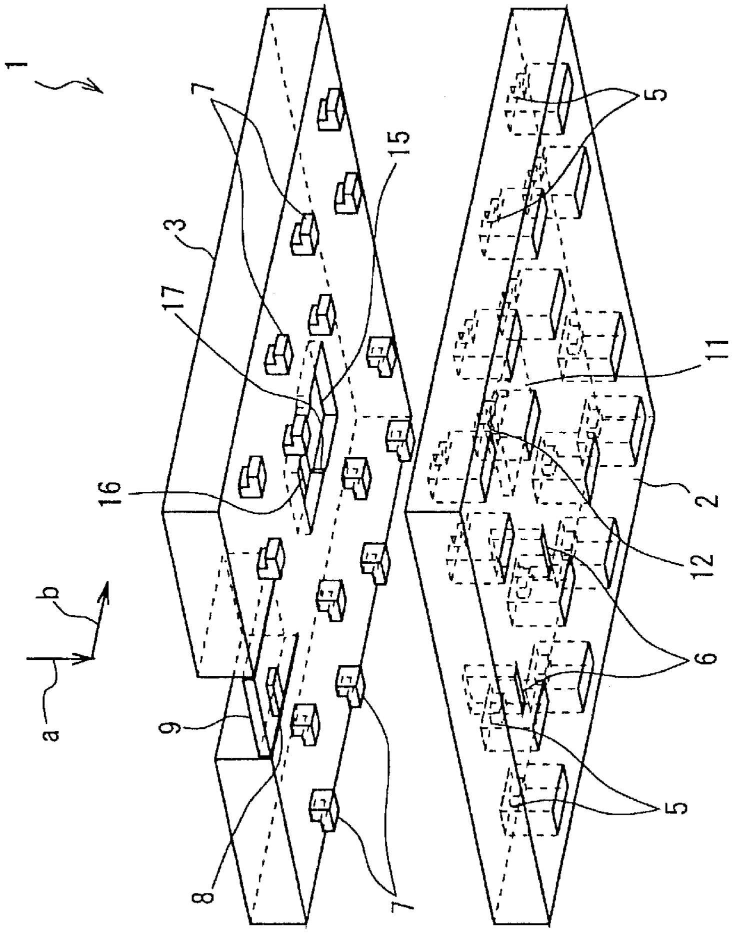
FIG. 8 is a perspective view when
Figure 9:
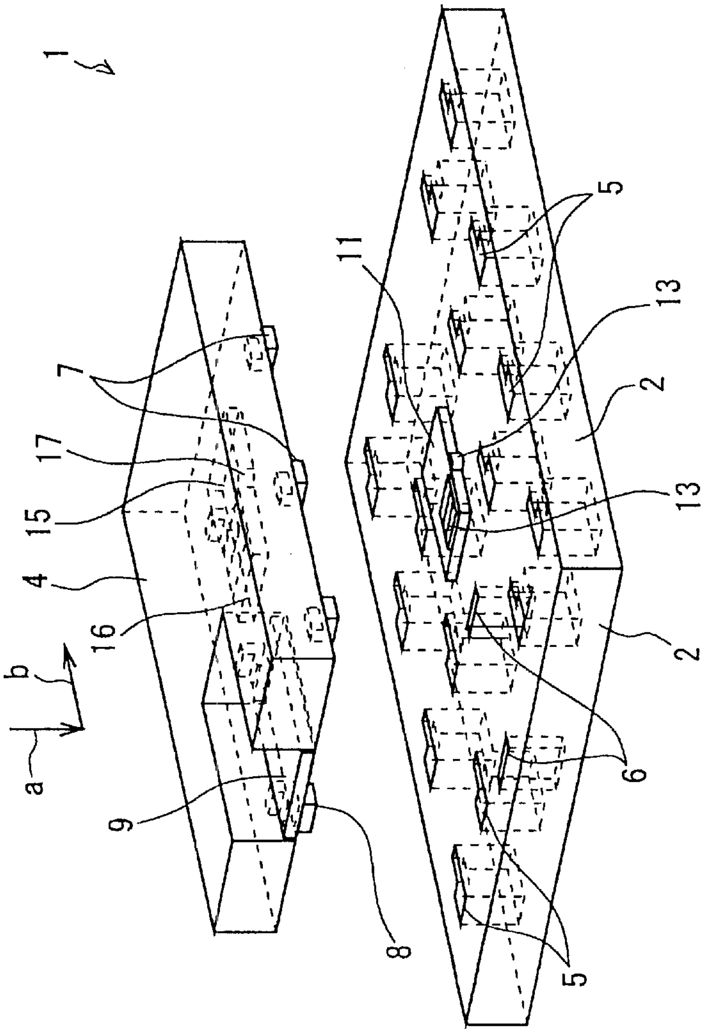
FIG. 9 is a perspective view explaining FIG. 7, when the lower component being smaller size is connected to the upper component.
Figure 10:
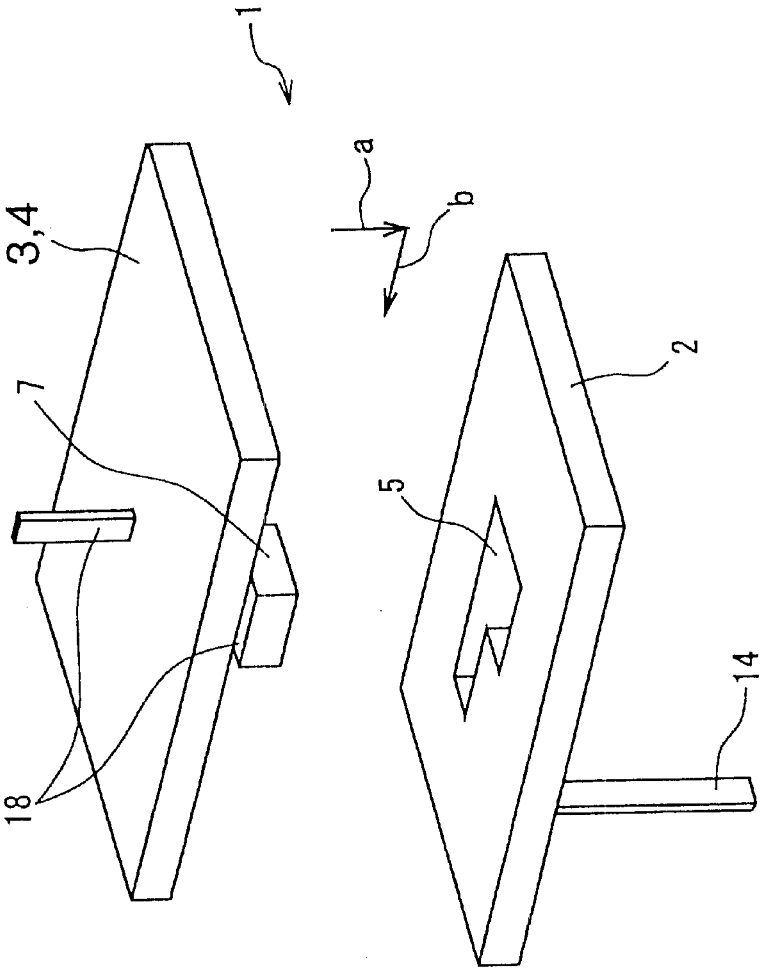
FIG. 10 is a perspective view explaining a sub-connection terminal of the connecting apparatus of FIG. 9, which is connected at a connection hole and a connection pawl.
Figure 11:
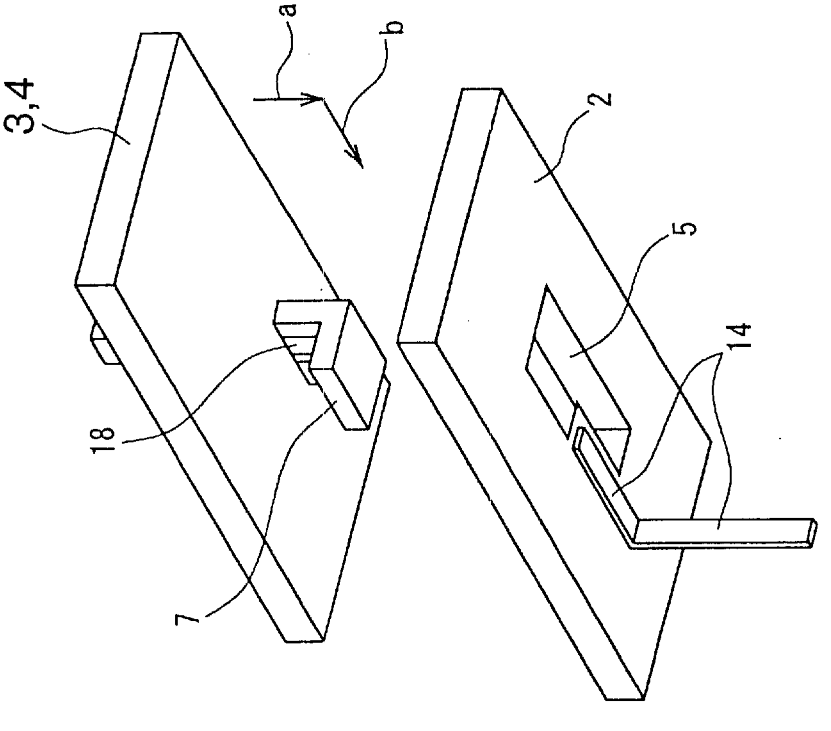
FIG. 11 is a perspective view when
Figure 12:
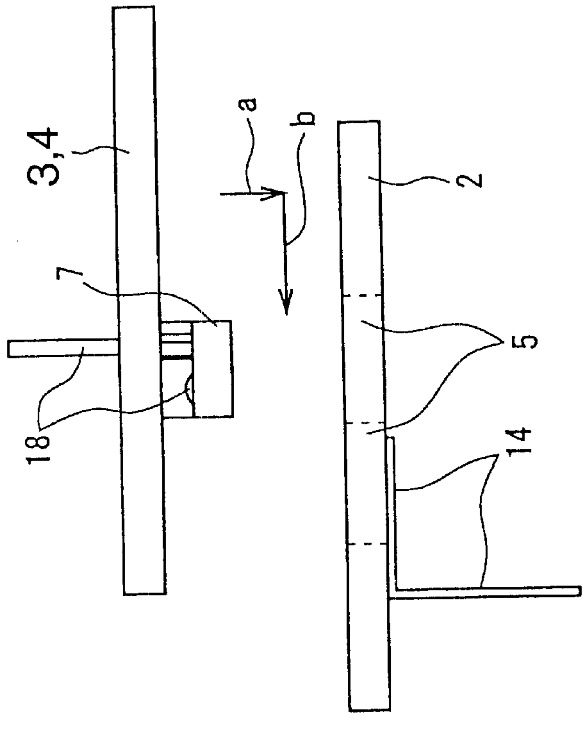
FIG. 12 is a side view of FIGS. 10 and 11.
Figure 13:
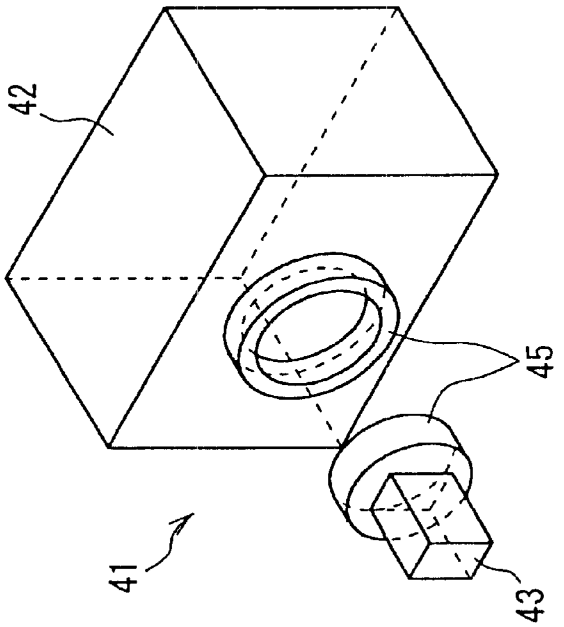
FIG. 13 is a perspective view explaining a conventional connecting apparatus.
Figure 14:
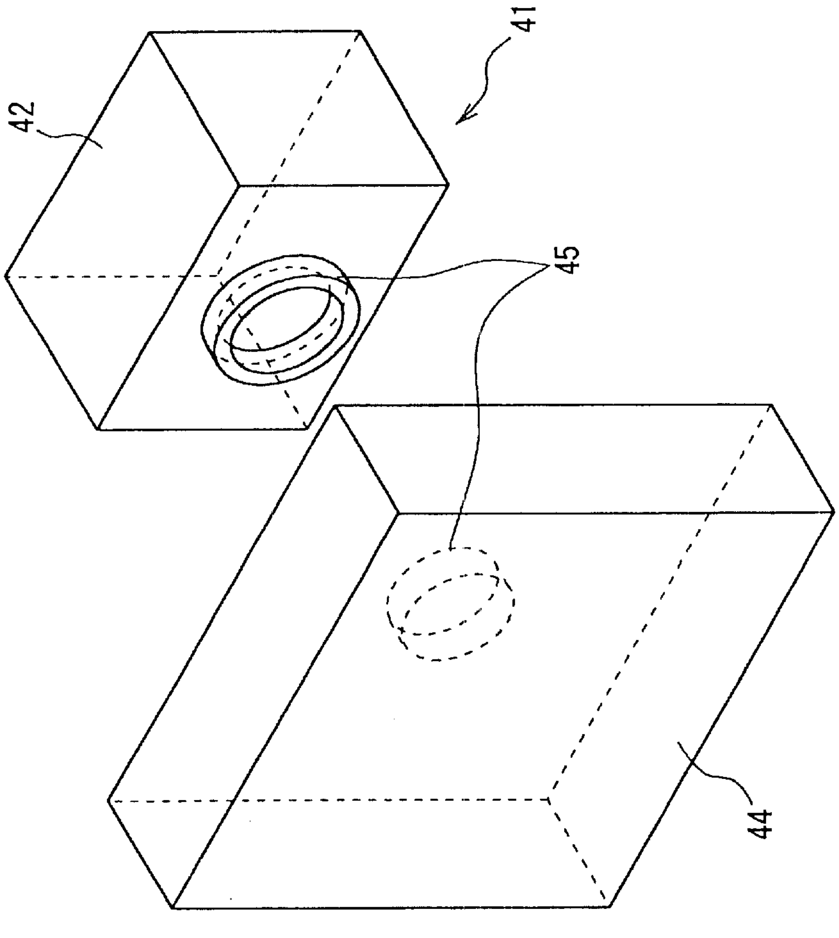
FIG. 14 is a perspective view explaining a conventional connecting apparatus.

Next, the robot 21 shown in FIG. 4 to FIG. 6 uses the body unit 22 and the tail unit 25 commonly, and four leg units 27 which are robot constituting units are replaced with two wheel units 29. Note that the mechanical and electrical connecting means same as the head unit base 24 and the tail unit base 26 are formed also in the respective wheel unit bases 30 of the two wheel units 29.

The robot 21 is constructed in such a way that the body unit 22 is rotated for 90° and the head unit 23 and the tail unit 25 are respectively connected to the front and the rear of the top plane 22*a* having a large area so as to be mechanically and electrically removable by the head unit base 24 and the tail unit base 26, and that two wheel units 29 are connected to the front and the rear of the bottom plane 22*a* having a large area of the body unit 22 so as to be mechanically and electrically removable by the wheel unit base 30.

As two examples of the robot 21 shown in FIG. 1 to FIG. 6, when various robot constituting units having different shapes and sizes, the head unit 23, the tail unit 24, the leg units 27, and the wheel units 29, are selectively connected to the body unit 22 being a common unit, the connecting apparatus 1 described above is used so that the places to install the head unit 23, the tail unit 25, the leg unit 27, and the wheel unit 29 on the body unit 22 can be changed freely. Therefore, it is possible to construct robots having various shapes freely and easily.

The embodiments according to this invention have been described above. This invention is not limited to the embodiments, but is changeable in many ways based on the technical ideas of this invention. For example, the connecting apparatus 1 is not limited to the connecting apparatus of robot, but is widely applicable to the connecting apparatus of various components. Further, the robot 21 is also applicable to the robots having various shapes.

Industrial Applicability

This invention is applicable to an entertainment robot.

What is claimed is:

1. The connecting apparatus comprising:

an upper component;

a plurality of lower components which are different sizes;

a plurality of mechanical connecting means and electrical connecting means which are formed on said upper component and which are arranged according to a fixed regulation; and a plurality of mechanical connecting means and electrical connecting means which are formed on a plurality of said lower components being different sizes respectively and which fit into a plurality of said mechanical connecting means and electrical connecting means of said upper component, and further which are set into the number fitting into the sizes of these lower components, wherein:

a plurality of said mechanical connecting means are composed of a plurality of connection holes and connection pawls; and a plurality of said electrical connecting means are composed of main connection terminals arranged at predetermined positions and sub-connection terminals which are connected at a plurality of said connection holes and connection pawls.

2. The connecting apparatus according to claim 1 wherein the connection pawls are inserted into the connection holes in a first direction, and then in a second direction.

3. The connecting apparatus according to claim 2, wherein the first direction creates a mechanical coupling and wherein the second direction creates an electrical coupling.

4. The connecting apparatus according to claim 1, wherein the upper component is a robot body and the plurality of lower components may be a head unit, a leg unit, a tail unit, and wheel units.

5. A robot comprising:

a common body unit;

a plurality of mechanical connecting means and electrical connecting means formed on a plurality of planes of said body unit; and a plurality of robot constituting units, each robot constituting unit having a plurality of mechanical connecting means and electrical connecting means to allow at least one robot constituting unit to be connected to at least one of said plurality of planes of said body unit selectively and removably, wherein the plurality of mechanical connection means are connection pawls and connection holes.

6. The robot according to claim 5, wherein a plurality of said robot constituting units are composed of a head unit, a tail unit, leg units, and wheel units.

7. The robot according to claim 5, wherein the common body unit has a different size than the robot constituting unit.

8. An electrically and mechanically connected structure, comprising:

a first component having a flat first component contacting surface and at least one L-shaped pawl projecting from the first component contacting surface and having a base portion and a foot portion connected to the base portion to form the L-shape, the base portion having a width with a flat base surface extending perpendicularly to the first component contacting surface, the foot portion having a flat foot surface extending perpendicularly to the base surface and defining a plane extending parallel to and facing the first component contacting surface;

a first electrical terminal extending into the first component, through the first component contacting surface and onto the base portion and foot portion of the pawl and in contact with the base surface and terminating in contact with the foot surface;

a second component having a flat second component contacting surface formed with at least one L-shaped connection hole extending into the second component contacting surface and to an opposite flat second component surface extending parallel to the second component contacting surface, the L-shaped connection hole having a first hole portion sized and adapted to slidably receive the foot portion of the pawl as the first and second components are moved toward each other in a first direction to contact the respective first and second component contacting surfaces and a second hole portion sized in a widthwise direction to slidably receive the base portion of the pawl in a second direction perpendicular to the first direction after the first and second components are in facial contact with each other; and a second electrical terminal contacting the opposite flat second component surface at a location adjacent the L-shaped connection hole such that sliding the first and second components relative to each other in the second direction when in facial contact with each other engages the base portion of the pawl and the second hole portion resulting in the first and second electrical terminals being in electrical contact with each other and the first and second components being mechanically connected to each other.

9. An electrically and mechanically connected structure according to claim 8, wherein when the first and second components are electrically and mechanically connected to each other, the foot surface of the foot is disposed adjacent and parallel to the opposite flat second component surface in a facially opposing relationship with the first and second electrical terminals interposed therebetween and in contact with each other.

* * * * *